United States Patent
Luo et al.

(10) Patent No.: US 6,784,146 B1
(45) Date of Patent: Aug. 31, 2004

(54) DEINKING METHOD AND COMPOSITION FOR WASTEPAPER

(75) Inventors: Jing Luo, Acworth, GA (US); David D. Dreisbach, Marietta, GA (US); Michael Lease Hemenway, Marietta, GA (US)

(73) Assignee: Kemira Chemicals, Inc., Marietta, GA (US)

( * ) Notice: Subject to any disclaimer, the term of this patent is extended or adjusted under 35 U.S.C. 154(b) by 0 days.

(21) Appl. No.: 09/699,303

(22) Filed: Oct. 27, 2000

(51) Int. Cl.$^7$ ................................................ C11D 1/72
(52) U.S. Cl. ...................... 510/174; 510/356; 510/421; 162/4; 162/5
(58) Field of Search ............................... 510/174, 356, 510/421; 162/4, 5

(56) References Cited

U.S. PATENT DOCUMENTS

| | | |
|---|---|---|
| 3,098,784 A | 7/1963 | Gorman, Jr. et al. |
| 3,354,028 A | 11/1967 | Illingworth |
| 3,392,083 A | 7/1968 | Illingworth |
| 3,446,696 A | 5/1969 | Illingworth |
| 3,501,373 A | 3/1970 | Illingworth |
| 3,766,001 A | 10/1973 | Gleason et al. |
| 3,767,524 A | 10/1973 | Gleason |
| 3,808,089 A | 4/1974 | Von Koeppen et al. |
| 3,932,206 A | 1/1976 | Illingworth et al. |
| 4,162,186 A | 7/1979 | Wood et al. |
| 4,311,552 A | 1/1982 | Brucato et al. |
| 4,360,439 A * | 11/1982 | Calmanti et al. ............. 252/61 |
| 4,483,741 A | 11/1984 | Maloney et al. |
| 4,518,459 A * | 5/1985 | Freis et al. .................... 162/5 |
| 4,618,400 A | 10/1986 | Wood et al. |
| 4,666,558 A * | 5/1987 | Wood et al. .................. 162/5 |
| 4,935,096 A | 6/1990 | Gallagher et al. |
| 4,959,123 A * | 9/1990 | Lehmann et al. ............. 162/5 |
| 5,094,716 A | 3/1992 | Letscher |
| 5,225,046 A | 7/1993 | Borchardt |
| 5,281,348 A | 1/1994 | Letscher |
| 5,387,355 A | 2/1995 | Letscher |
| 5,449,725 A | 9/1995 | Kanluen et al. |
| 5,460,695 A * | 10/1995 | Kato .............................. 162/5 |
| 5,651,861 A * | 7/1997 | Larson et al. .................. 162/5 |
| 5,665,204 A * | 9/1997 | Rodriguez et al. ............ 162/5 |
| 5,807,464 A * | 9/1998 | Jobbins et al. ................. 162/5 |
| 6,103,056 A * | 8/2000 | Irinatsu et al. ................. 162/4 |

FOREIGN PATENT DOCUMENTS

| | | |
|---|---|---|
| FR | 1453204 | 8/1966 |
| GB | 1347971 | 2/1974 |

OTHER PUBLICATIONS

U.S. Environmental Protection Agency; Premanufacture Notice for New Chemical Substances. Case No. TS–000122 (incomplete article).

U.S. Environmental Protection Agency; Premanufacture Notice for New Chemical Substances; Document Control No. 51980000062; EPA Case No. P98–62–65; TS–000122; pp. 000001–000163; Aug. 18, 1998.

* cited by examiner

*Primary Examiner*—Charles Boyer
(74) *Attorney, Agent, or Firm*—Clark G. Sullivan; King & Spalding LLP

(57) ABSTRACT

The present invention is a deinking method and composition that uses at least 50% by weight based on the total weight of surfactants of non-ionic, C16 to C25 aliphatic, monohydric alcohol alkoxylates having 14 to 40 moles of ethylene oxide per mole of alcohol and 0 to 10 moles of propylene oxide per mole of alcohol. Using deinking compositions to deink wastepaper pulp wherein the surfactants primarily include the C16 to C18 aliphatic alcohol alkoxylates of the invention produces paper having excellent brightness and low effective residual ink concentrations. In addition, a low amount of sizing agents is used to produce paper having acceptable levels of water repellency.

12 Claims, No Drawings

DEINKING METHOD AND COMPOSITION FOR WASTEPAPER

FIELD OF THE INVENTION

The present invention relates to deinking methods and compositions for waste paper and particularly to washing ink removal methods and compositions for recycle mills that use less sizing agents to produce paper having increased brightness and reduced effective residual ink concentration (ERIC).

BACKGROUND OF THE INVENTION

The paper industry has been practicing wastepaper recycling to regenerate usable cellulosic fiber for paper making for many decades. In these processes, ink is removed from the wastepaper pulp using a suitable deinking composition. By controlling the deinking process, a recycling mill can affect the properties of the paper such as the brightness and can improve the usability of the cellulosic fiber for paper manufacturing.

There are two major types of deinking methods or practices, namely flotation/washing combination deinking and wash deinking. Flotation/washing combination deinking refers to a deinking process wherein the ink released by the deinking composition is separated from the cellulosic fibers primarily through the flotation devices or flotation cells of the recycling process prior to passing the pulp through washing stages (e.g. throuh washers). Wash deinking, on the other hand, refers to a deinking process wherein the ink released by the deinking composition is separated from the cellulosic fibers primarily in the washing stages.

Many deinking compositions have been developed specifically for wash deinking processes. In particular, various types of surfactants have been described as effective deinking agents. These surfactants include alkyl phenol alkoxylates, alpha olefin sulfonates, and aliphatic alcohol alkoxylates, as well as many other nonionic and anionic surfactants and mixtures of surfactants and other chemical agents. Generally, all of these compositions are required to have fluidity at room temperature for ease of feeding.

Conventional deinking compositions for wash deinking processes have been directed to improving deinking performance only, and particularly directed to removing ink from pulp to produce pulp with acceptable brightness for papermaking. There is a need to further improve the brightness of the paper pulp produced by wash deinking processes.

Furthermore, conventional deinking compositions significantly increase the water absorbency of paper and thus do not provide the amount of water repellency desired for certain types of paper such as recycled newsprint. As a result, paper made from wash deinking processes that use conventional deinking compositions has poor press room performance in the printing facility due to the extreme water absorbency of the paper. To improve the press room runability, paper manufacturers have had to use large amounts of a sizing agent, such as alkyl ketene dimer (AKD), in the manufacture of the paper to improve the water resistance (size) of the paper. Unfortunately, however, using large amounts of sizing agents results in the deposition of sizing agents on paper machinery, which is a significant problem in the recycled newsprint industry. In particular, because of the deposition of sizing agents on paper machinery, the paper machinery must be cleaned on a frequent basis thereby affecting the runability of the paper machinery. Moreover, the excessive use of sizing agents also impacts the coefficient of friction, which can cause problems in the paper such as crepe wrinkles, bursts and telescoping. Therefore, there is a need in the art to produce a deinking composition that reduces the amount of sizing agents needed to produce paper having high water repellency.

SUMMARY OF THE INVENTION

The present invention is a deinking method and composition that overcomes the problems associated with conventional deinking compositions. The deinking method and composition uses at least 50% by weight based on the total weight of surfactants of non-ionic, C16 to C25 aliphatic, monohydric alcohol alkoxylates having 14 to 40 moles of ethylene oxide per mole of alcohol and 0 to 10 moles of propylene oxide per mole of alcohol. It has been discovered that using deinking compositions to deink wastepaper pulp wherein the surfactants primarily include the C16 to C25 aliphatic alcohol alkoxylates of the invention unexpectedly produces paper having increased brightness and significantly decreased effective residual ink concentration (ERIC). Furthermore, it has also been discovered that using these C16 to C25 aliphatic alcohol alkoxylates to deink wastepaper pulp unexpectedly produces paper that requires a substantially lower amount of sizing agents to produce paper having acceptable levels of water repellency. Therefore, the deinking composition of the invention can be used in industries such as the newsprint industry with reduced sizing aent deposition on the machinery and thus increased paper machine runability. Furthermore, the deinking composition of the invention produces low levels of foaming as is desired in wastewater deinking processes.

The present invention comprises a deinking composition comprising one or more surfactants, the surfactants including at least 50% by weight, preferably at least about 70% by weight, and more preferably at least about 80% by weight based on the total weight of surfactants of non-ionic, C16 to C25 aliphatic, monohydric alcohol alkoxylates having 14 to 40 moles of ethylene oxide per mole of alcohol and 0 to 10 moles of propylene oxide per mole of alcohol. In one preferred embodiment of the invention, the surfactants in the composition consist essentially of non-ionic, C16 to C25 aliphatic, monohydric alcohol alkoxylates having 14 to 40 moles of ethylene oxide per mole of alcohol and 0 to 10 moles of propylene oxide per mole of alcohol. Preferably, the aliphatic alcohol alkoxylates of the invention are C16 to C18 aliphatic alcohol alkoxylates. For the C16–C25 aliphatic alcohol alkoxylates of the invention, the average number of ethylene oxide groups per alkoxylate molecule is preferably from about 16 to about 30 and the average number of propylene oxide groups per alkoxylate molecule is preferably from 0 to about 6. The C16–C25 aliphatic alcohol alkoxylates of the invention can be saturated or unsaturated. Preferably, the C16 to C25 aliphatic alcohol alkoxylates are saturated and have the formula:

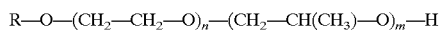

$$R-O-(CH_2-CH_2-O)_n-(CH_2-CH(CH_3)-O)_m-H$$

wherein R is a straight chain or branched chain C16–C25 alkyl group, n is from 14 to 40 and m is from 0 to 10. More preferably, the C16–C25 aliphatic alcohol alkoxylates of the invention are straight chained. The C16–C25 aliphatic alcohol alkoxylates of the invention are preferably based on primary or secondary alcohols, and are more preferably based on primary alcohols. The deinking composition of the invention can further include from 0 to about 30% by weight of one or more fatty acids based on the total weight of surfactants. Preferably, the fatty acids are C8 to C20 fatty acids and can be selected from the group consisting of lauric acid, oleic acid, stearic acid, tall oil fatty acid, tallow fatty acid, coconut fatty acid, and mixtures thereof.

The present invention further includes a process for deinking wastepaper comprising the steps of contacting wastepaper pulp with the deinking composition discussed above. The surfactants (including the C16 to C25 aliphatic alcohol alkoxylates of the invention) are preferably present in the deinking composition in an amount from about 0.3% to about 0.7% by weight based on the oven-dry weight of the wastepaper pulp. In addition, the wastepaper pulp is preferably contacted with the deinking composition at a pH of from greater than 7 to about 10. The resulting wastepaper pulp can be used to make paper having increased brightness and low effective residual ink concentrations. In addition, in industries that use sizing agents to produce paper such as the recycled newsprint industry, the wastepaper pulp can be used to make paper having good water repellency without using large amounts of sizing agents.

These and other features and advantages of the present invention will become more readily apparent to those skilled in the art upon consideration of the following detailed description, which describes both the preferred and alternative embodiments of the present invention.

DETAILED DESCRIPTION OF THE INVENTION

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention is a deinking method and composition for wastepaper recycling that produces paper having excellent brightness, low ERIC values, and good water repellency properties without the need to use large amounts of sizing agents. The deinking compositions of the invention typically include water, one or more surfactants as described below, and optionally fatty acids.

The surfactants in the deinking compositions of the invention primarily include non-ionic, C16 to C25 aliphatic, monohydric alcohol alkoxylates having 14 to 40 moles of ethylene oxide per mole of alcohol and 0 to 10 moles of propylene oxide per mole of alcohol. More preferably, the number of moles of ethylene oxide per mole of alcohol is from 16 to 30, and even more preferably 18 to 25. In addition, the number of moles of propylene oxide per mole of alcohol is more preferably from 0 to 6. The C16 to C25 aliphatic alcohol alkoxylates of the invention are water-soluble and can be saturated or unsaturated, straight chained or branched. In addition, the C16 to C25 aliphatic alcohol alkoxylates of the invention can be derived from primary or secondary alcohols. Preferably, the C16–C25 aliphatic alcohol alkoxylates are C16–C18 aliphatic alcohol alkoxylates. The C16 to C25 aliphatic alcohol alkoxylates of the invention are preferably saturated and straight chained, and preferably derived from primary alcohols. The preferred C16 to C25 aliphatic alcohol alkoxylates of the invention can be represented by the following formula:

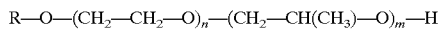

wherein R is a straight chain or branched chain C16–C25 alkyl group, n is from 14 to 40 and m is from 0 to 10. The average number of ethylene oxide groups per molecule in the C16 to C25 aliphatic alcohol alkoxylates of the invention is from about 14 to about 40 moles, and preferably from about 16 to about 30. The average number of propylene oxide groups per molecule in the C16 to C25 aliphatic alcohol alkoxylates of the invention is from 0 to about 10, preferably from 0 to about 6. When the C 16 to C25 aliphatic alcohol alkoxylates of the invention include both ethylene oxide and propylene oxide groups, these alkoxylate groups can occur randomly in the molecule or can occur in blocks. The C16 to C25 aliphatic alcohol alkoxylates used in the deinking compositions of the invention include one or more aliphatic alcohol alkoxylates within the C16–C25 range and are typically blends of two or more of these alkoxylates.

The C16 to C25 aliphatic alcohol alkoxylates used in accordance with the invention can be prepared by any methods known in the art. For example, it is known in the art to produce aliphatic alcohol alkoxylates by adding to an alcohol or mixture of alcohols to be ethoxylated or propoxylated, a calculated amount, e.g., from about 0.1 percent by weight to about 0.6 percent by weight, preferably from about 0.1 percent by weight to about 0.4 percent by weight, based on total alcohol, of a strong base, typically an alkali metal or alkaline earth metal hydroxide such as sodium hydroxide or potassium hydroxide, which serves as a catalyst for the ethoxylation or propoxylation. The resulting mixture can be dried, as by vapor phase removal of any water present, and the amount of ethylene oxide or propylene oxide needed to provide the desired amount of ethoxylation or propoxylation is added. The resulting mixture is allowed to react until the ethylene oxide or propylene oxide is consumed, the course of the reaction being followed by the decrease in reaction pressure. Where the alcohols are to be randomly ethoxylated and propoxylated, the desired amounts of ethylene oxide and propylene oxide can be added together to the alcohol mixture. Alternatively, where the alcohols are to include block ethoxylation and propoxylation, the desired amount of one of ethylene oxide and propylene oxide is added first to the alcohol mixture and reacted with the alcohol and then the other alkylene oxide is added. The C16 to C25 aliphatic alcohol alkoxylates used in the invention are commercially available, e.g., from Ethox Corporation or ICI Surfactants/Uniqema.

It has been discovered that the C16 to C25 aliphatic alcohol alkoxylates of the invention directly and positively affect the brightness, ERIC values, and water repellency of the paper produced using the deinking compositions of the invention. Therefore, the surfactants of the invention include at least 50% by weight, preferably at least about 70% by weight, and more preferably at least about 80% by weight based on the total weight of surfactants of these C16 to C25 aliphatic alcohol alkoxylates. To maximize the benefits of the C16 to C25 aliphatic alcohol alkoxylates of the invention, the surfactants in the composition can consist essentially of non-ionic, C16 to C25 aliphatic, monohydric alcohol alkoxylates having 14 to 40 moles of ethylene oxide per mole of alcohol and 0 to 10 moles of propylene oxide per mole of alcohol. Nevertheless, the deinking composition can include other surfactants to provide other desired properties to the deinking composition or to the resulting paper. For example, nonionic and anionic surfactants such as C16–C25 alkoxylated aliphatic polyols, C6–C15 alkoxylated aliphatic alcohols, alkoxylated fatty or other alkoxylated aliphatic carboxylic acids, alkoxylated aliphatic thiols, alkoxylated aliphatic amines, alkoxylated aliphatic sulfonates, and alkoxylated C16–C25 aliphatic monohydric alcohols having low alkoxylation levels (e.g. less than 10 total alkoxylate units per alcohol molecule). The deinking compositions of the invention typically include no more than 50%, preferably no more than 30%, and more preferably no more than about 20% of these additional surfactants by weight based on the total weight of surfactants in the composition. In addition, the compositions of the invention are preferably "NPE-free," i.e., are free of nonylphenol ethoxylates, which are sometimes considered not to be environmental friendly.

The deinking composition of the invention can further include from 0 to about 30% by weight of one or more fatty acids based on the total weight of surfactants. Preferably, the fatty acids are present in an amount from 0 to about 18% by weight based on the total weight of surfactants. The fatty acids are preferably C8 to C20 fatty acids and can be selected from the group consisting of lauric acid, oleic acid, stearic acid, tall oil fatty acid, tallow fatty acid, coconut fatty acid, and mixtures thereof.

The deinking compositions of the invention differ from conventional deinking compositions in that the deinking compositions of the invention tend to be solid or waxy at room temperature (i.e. 20° C.). Solid deinking compositions have generally been avoided in conventional processes, which have instead used liquid compositions. However, the deinking compositions can easily be made and kept fluid by maintaining the temperature of the deinking composition at elevate temperatures, e.g. at greater than about 105° F. for the C16–C18 aliphatic alcohol alkoxylates of the invention. Therefore, the deinking compositions of the invention can be delivered to the pulping system using existing mill equipment.

The deinking process of the invention is generally conducted by pulping printed wastepaper materials in the presence of the deinking composition in a vessel that is commonly known in the art as a "pulper" or "repulper." Pulping is normally conducted under a specific set of conditions including temperature, pH, water hardness, and the like. Preferably, the deinking temperature ranges from about room temperature to about 150° F., the pH ranges from greater than 7 to about 10, and the water hardness ranges from about 30 to about 300 PPM $CaCO_3$. The deinking composition is added to the pulper in an amount such that the amount of the surfactants (including the C16 to C25 aliphatic alcohol alkoxylates) present in the pulper are from about 0.3 to about 0.7% by weight based on the oven-dry weight of the waste paper. In addition to the deinking composition of the invention, additional chemicals can be added to the pulper such as sodium hydroxide to control the pH of the composition in the pulper, and alkali metal phosphates and silicates to modify the properties of the composition in the pulper.

After the pulping step, the pulped slurry is subjected to cleaning, screening, and washing stages where ink and other contaminants are separated from the cellulosic fiber stream. Then, the deinked pulp is thickened and then bleached to the target brightness and sent to the paper machine where it is made into paper. Various paper machine additives, such as strength aids, drainage aids, and paper sizing agents are typically added to the paper machine. The paper is generally made to meet certain specifications such as brightness, count, strength, size (water repellency) or water absorbency level, and the like. The pulping, cleaning, screening, washing, thickening and bleaching steps used to make paper according to the invention are generally known in the art and are described, for example, in R. G. Macdonald and J. N. Franklin, Pulp and Paper Manufacture, 2$^{nd}$ ed., Vol. 3; Papermaking and Paperboard Making, McGraw-Hill Book Co., New York, 1970.

In industries that use sizing agents to produce paper having a desired level of water repellency such as the recycled newsprint industry, large amounts of sizing agents must be used with conventional deinking surfactants because the conventional deinking surfactants significantly increase the water absorbency of the paper. It has been unexpectedly discovered that the C16 to C25 aliphatic alcohol alkoxylates of the invention have significantly less of an effect on increasing the water absorbency of the paper. Therefore, less sizing agent is needed to produce paper having the same level of water repellency. This unexpected benefit also benefits the runability of the paper making machinery because less deposition of the sizing agents occurs on the paper machinery. Therefore, the paper machinery can be operated without the need to frequently shut down the machinery to remove the sizing agent deposits or to even replace the paper machinery.

The present invention will now be further described by the following non-limiting examples, which demonstrate the unexpected results produced by the C16 to C25 aliphatic alcohol alkoxylates of the invention.

EXAMPLE 1

To demonstrate the improvement in deinking efficiency produced by the deinking compositions of the invention, a parallel comparison between conventional wash deinking surfactants or compositions and the deinking compositions of the present invention was conducted as illustrated below. In each case, 0.45% of the deinking surfactant(s) based on the oven-dry weight of wastepaper were applied to the pulper at a pH of about 7.8. The pulp slurry was then subjected to a washing treatment by diluting the pulp slurry to 1% and thickening it to 8%. The deinked pulp was then formed into a paper sheets or pads which were evaluated for brightness and ERIC. ERIC is the abbreviation for Effective Residual Ink Concentration and is measured with a TECHNIBRITE® TB-1C instrument manufactured by Technidyne Corporation. The ERIC value is a measure of the effect of the remaining ink, or the overall darkening effect of the residual ink. The lower the ERIC value the lower the amount of residual ink on the fiber. The ERIC value is conventionally used by mills, as well as research facilities and product development facilities to determine ink retention in paper sheet. Percentages are on a per weight basis. The results are tabulated below.

|  | Surfactants or compositions | Brightness, % | ERIC, PPM |
|---|---|---|---|
| Prior art | Commercial Wash Deinking Agent 1[1] | 50.4 | 357 |
| Prior art | Commercial Wash Deinking Agent 2[2] | 50.6 | 344 |
| Prior art | $C_{12}$ linear alcohol $(EO)_7$ | 49.8 | 396 |
| Prior art | Dodecylphenol $(EO)_{5.5}$ | 46.8 | 662 |
| Prior art | Secondary $C_{14}$–$C_{15}$ alcohol EOPO (cloud point at 41° C.) | 48.6 | 429 |
| Prior art | Secondary $C_{14}$–$C_{15}$ alcohol EOPO (cloud point at 38° C.) | 49.1 | 340 |
| Prior art | Nonylphenol $(EO)_9$ | 48.4 | 445 |
| Prior art | Linear $C_{14}$ alcohol $(EO)_{12}/C_{14}(EO)_4$ | 49.3 | 43 1 |
| Prior art | Tridecyl alcohol $(EO)_9$ | 49.4 | 438 |
| Prior art | Tridecyl alcohol $(EO)_{12}$ | 50.3 | 325 |
| Prior art | Tridecyl alcohol $(EO)_{15}$ | 49.5 | 372 |
| Prior art | Tridecyl alcohol $(EO)_{12}$/fatty acid[3] at 85%/15% | 49.9 | 367 |

-continued

| | Surfactants or compositions | Brightness, % | ERIC, PPM |
|---|---|---|---|
| Prior art | Linear $C_{14-15}$ alcohol $(EO)_{13}$/fatty acid at 85%/15% | 50.3 | 336 |
| Prior art | Linear $C_{14}$ alcohol $(EO)_{12}$ | 49.8 | 334 |
| Prior art | Linear $C_{14-15}$ Alcohol $(EO)_{13}$ | 50.1 | 359 |
| Prior art | Decyl alcohol $(EO)_9$ | 49.3 | 358 |
| Invention | Linear $C_{18}$ alcohol $(EO)_{20}$ | 52. t | 219 |
| Invention | Linear $C_{18}$ alcohol $(EO)_{20}$/fatty acid at 85%/15% | 52.3 | 237 |
| Invention | Mixed $C_{16-18}$ alcohol $(EO)_{20}$ | 51.8 | 232 |
| Invention | Mixed $C_{16-18}$ alcohol $(EO)_{20}$/fatty acid at 85%/15% | 51.5 | 243 |
| Comparative | Mixed $C_{16-18}$ alcohol $(EO)_{20}$/fatty acid at 70%/30% | | |
| Invention | Mixed $C_{16-18}$ alcohol $(EO)_{18}$ | 51.5 | 240 |
| Invention | Mixed $C_{16-18}$ alcohol $(EO)_{21}$ | 51.9 | 221 |
| Invention | Mixed $C_{16-18}$ alcohol $(EO)_{25}$ | 51.6 | 242 |
| Invention | Linear $C_{18}$ alcohol $(EO)_{25}$ | 52.2 | 225 |
| Invention | Linear $C_{18}$ alcohol $(EO)_{25}/(PO)_3$ Random | 51.9 | 243 |
| Invention | Linear $C_{18}$ alcohol $(EO)_{25}(PO)_6$ Random | 51.5 | 256 |
| Invention | Linear $C_{18}$ alcohol $(EO)_{25}(PO)_3$ Blocked | 51.6 | 266 |
| Invention | Mixed $C_{16-18}$ alcohol $(EO)_{20}$/SLF18[4] at 80/20 | 51.7 | 232 |
| Invention | Mixed $C_{16-18}$ alcohol $(EO)_{20}$/TDA8.5[5] at 80/20 | 51.3 | 265 |

[1]Commercial Wash Deinking Agent 1 is believed to be a blend of C14–C15 alcohols with $(EO)_{13}$ and fatty acids.
[2]Commercial Wash Deinking Agent 2 is believed to include C14–C15 alcohols with $(EO)_{13}$ as the main component.
[3]The fatty acid used in this example and the following examples primarily includes oleic acid.
[4]SLF18 is an ethoxylated/propoxylated secondary C14 alcohol with a cloud point at 18° C. available from BASF Corporation.
[5]TDA8.5 is an ethoxylated tridecyl alcohol with 8.5 moles of ethylene oxide per molecule of alcohol.

The surfactants tested in this example included deinking surfactants disclosed in prior art patents and commercially available surfactants, as well as the surfactants of the present invention. Repeatedly, it was demonstrated that the surfactants used in the deinking compositions of the invention were more effective in deinking waste paper.

In particular, as shown above, the use of the C16 to C18 aliphatic alcohol alkoxylates of the invention in deinking compositions repeatedly produced unexpected increases in brightness and decreases in ERIC values over conventional surfactants. The benefits of the invention were even realized when up to about 20% of conventional surfactants were used in the deinking composition and it is believed that greater amounts of conventional surfactants (up to about 30% or even up to about 50%) could be used with the surfactants of the invention to produce increased results over the use of conventional surfactants alone. In addition, the benefits of the surfactants of the invention were realized even when fatty acids were used in an amount of about 18% by weight of the total surfactants used and it is believed that up to 30% could be used without sacrificing the benefits of the invention. It is also believed that the benefits of the invention would be realized if aliphatic alcohol alkoxylates having larger carbon chains were used (i.e. C19 to C25) especially since the C18 aliphatic alcohol alkoxylates of the invention produced such beneficial results.

EXAMPLE 2

To demonstrate the versatility of the deinking compositions of the invention, an exemplary deinking composition of the invention and a conventional deinking composition were tested at different processing conditions. The superiority of the deinking composition of the present invention at various pH's is demonstrated below.

| | 85% Linear $C_{14-15}$ primary alcohol $(EO)_{13}$/15% fatty acid | 85% Linear $C_{18}$ alcohol $(EO)_{20}$/15% fatty acid |
|---|---|---|
| Solid Content, wt % | 5 | 5 |
| Temperature, °F. | 125 | 125 |
| Surfactant, wt % based on solid | 0.45 | 0.45 |
| Water Hardness, PPM | 100 | 100 |
| Pulping time, min. | 7 | 7 |
| Washing (1% to 8%)[1] | Yes | Yes |
| | Brightness, % | Brightness, % |
| pH after pulping = 6.5 | 40.3 | 40.9 |
| pH after pulping = 8.0 | 41.4 | 42.9 |
| pH after pulping = 9.5 | 40.0 | 41.0 |

[1]Washing was conducted by diluting the pulp slurry to 1% with water and thickening the slurry to 8% on a mesh screen.

EXAMPLE 3

The superiority of the deinking of composition the invention under various processing temperatures is demonstrated in the table below.

| | 85% Linear $C_{14-15}$ primary alcohol $(EO)_{13}$/15% fatty acid | 85% Linear $C_{18}$ alcohol $(EO)_{20}$/15% fatty acid |
|---|---|---|
| Solid Content, wt % | 5 | 5 |
| pH after pulping | 8 | 8 |
| Surfactant, wt % based on solid | 0.45 | 0.45 |
| Water Hardness, PPM | 100 | 100 |
| Pulping time, min. | 7 | 7 |
| Washing (1% to 8%)[1] | Yes | Yes |
| | Brightness, % | Brightness, % |
| Pulping Temperature = 115° F. | 40.6 | 41.5 |
| Pulping Temperature = 105° F. | 41.4 | 42.9 |
| Pulping Temperature = 95° F. | 41.2 | 42.4 |

[1]Washing was conducted by diluting the pulp slurry to 1% with water and thickening the slurry to 8% on a mesh screen.

EXAMPLE 4

The superiority of the deinking composition of the invention at various water hardness values (calculated as $CaCO_3$ in PPM) is demonstrated in the following table.

|  | 85% Linear $C_{14-15}$ primary alcohol $(EO)_{13}$/15% fatty acid | 85% Linear $C_{18}$ alcohol $(EO)_{20}$/15% fatty acid |
|---|---|---|
| Solid Content, wt % | 5 | 5 |
| pH after pulping | 8 | 8 |
| Surfactant, wt % based on solid | 0.45 | 0.45 |
| Pulping Temperature, °F. | 115 | 115 |
| Pulping time, minutes | 7 | 7 |
| Washing (1% to 8%) | Yes | Yes |
|  | Brightness, % | Brightness, % |
| Water Hardness = 100 PPM | 41.4 | 42.9 |
| Water Hardness = 200 PPM | 40.0 | 41.9 |
| Water Hardness = 400 PPM | 39.4 | 40.7 |

[1]Washing was conducted by diluting the pulp slurry to 1% with water and thickening the slurry to 8% on a mesh screen.

EXAMPLE 5

The deinking compositions of the present invention are also more effective in deinking aged wastepaper than conventional deinking compositions. It is known in the art that wastepaper when aged becomes more difficult to be deinked. This is normally known as the "summer effect." tills have focused a significant amount of effort to increasing the deinking chemical usage at the pulper and/or the bleaching chemical usage after deinking to boost the final brightness of recycled paper based on aged wastepaper. The deinking surfactants in the invention allow the mill to deink aged wastepaper more effectively. A series of deinking tests were conducted with wastepaper aged for different periods of time using the exemplary deinking composition of the invention described in Examples 2–4 and the conventional deinking composition described in Examples 2–4 and the brightness increase between the deinking composition of the present invention and the conventional deinking composition after deinking was measured. Results are provided below.

| Age of Wastepaper, months | Brightness Improvement (ISO Brightness)[1] |
|---|---|
| 2 | 0.2 |
| 9 | 0.9 |
| 12 | 1.1 |
| 18 | 1.5 |

[1]Absolute brightness improvement on the washed pulp.

As shown above, a significant increase in brightness was observed particularly with increased wastepaper age. This demonstrates a further advantage of the invention in that it can be used effectively with aged wastepaper.

EXAMPLE 6

It has been demonstrated repeatedly that the deinking compositions of the present invention are capable of improving ink removal efficiency under various processing conditions as shown in the previous examples. In addition to these benefits, it has been unexpectedly discovered that pulp treated or deinked with the deinking compositions of the invention requires less size application at the paper machine to reach the desired size level or water repellency required by the printing process. Reducing the usage of sizing agents leads to reduced machine deposition and improved machine runability. The size level, the water repellency, or the resistance to water absorbency is normally monitored by either measuring the weight gain using a Cobb test or the water drop using a water drop test.

Example 6 demonstrates the impact of the deinking surfactants or compositions of the invention and conventional deinking surfactants or compositions on the rosin/alum sizing of paper. The effect of rosin/alum size is determined in this example by measuring the water gain (in grams) using a Cobb test. Handsheets were made at 5 g dry fiber/sheet and each sheet was treated with 12#/ton alum and 4#/ton rosin size. The sheets (other than the blanks) were treated with 2#/ton of the surfactants listed. The pulp was adjusted to a pH of 5.7–5.8 before formation of the handsheets and was left to sit overnight. The Cobb test involved soaking the handsheet specimens in distilled water for 3 minutes and measuring the gain in weight from the absorption of water by the paper sheet. Well-sized paper will absorb less water, and therefore will have less weight gain. The composition in the present invention has less impact on rosin/alum sizing than conventional deinking surfactants as shown below.

| Surfactant | Description of Surfactant | Water Gain, g (Cobb Test)* |
|---|---|---|
| Blank | No surfactant | 0.6 |
| Present Invention | $C_{18}(EO)_{20}$ | 1.8 |
| Present Invention | Mixed $C_{16-18}$ $(EO)_{20}$/fatty acid (85%/15%) | 2.4 |
| Present Invention | Mixed $C_{16-18}$ $(EO)_{20}$ | 3.0 |
| BIO-TERGE ® AS-40[1] | Alpha olefin sulfonates (anionic surfactant) | 0.4 |
| RHODAMOX ® LO[2] | Lauryl dimethylamine oxide (cationic surfactant) | 0.5 |
| IGEPAL ® CO-730[3] | Nonyl phenol $(EO)_{15}$ | 13.5 |
| SURFONIC ® L24-9[4] | Linear $C_{12-14}$ alcohol $(EO)_9$ | 15.8 |
| NEODOL ® 45-13[5] | Linear $C_{14-15}$ alcohol $(EO)_{13}$ | 16.3 |
|  | Linear $C_{14}-C_{15}$ alcohol $(EO)_{13}$/fatty acid (85%/15%) | 16.6 |
| PLURONIC ® L-10 | Blocked EOPOEO polymer[6] | 16.7 |
| NEODOL ® 45-13 blend | Linear $C_{14-15}$ alcohol $(EO)_{13}$/Fatty acid (85%/15%) | 17.0 |
| IGEPAL ® RC-520 | Nonyl phenol $(EO)_{5.5}$ | 17.4 |
| IGEPAL ® CO-630 | Nonyl phenol $(EO)_9$ | 17.5 |
| RHODASURF ® L-7[7] | Linear alcohol $(EO)_7$ | 17.8 |
| RHODASURF ® LA-12 | Linear alcohol $(EO)_{12}$ | 18.2 |
| RHODASURF ® TDA 8.5 | Tridecyl alcohol $(EO)_{8.5}$ | 18.5 |
| POLYTERGENT ® | Secondary | 19.1 |

-continued

| Surfactant | Description of Surfactant | Water Gain, g (Cobb Test)* |
|---|---|---|
| SLF-18[8] | $C_{14-15}$ alcohol alkoxylates (cloud Point at 18° C.) | |
| IGEPAL ® RC-630 | Alkyl phenol $(EO)_{11}$ | 19.9 |

[1]BIO-TERGE ® products are available from Stefan Company.
[2]RHODAMOX ® products are available from Rhodia, Inc.
[3]IGEPAL ® products are available from Rhodia, Inc.
[4]SURFONIC ® L24-9 is available from Huntsman Corporation.
[5]NEODAL ® 45-13 is available from Shell.
[6]PLURONIC ® products are available from BASF Corporation.
[7]RHODASURF ® products are available from Rhodia, Inc.
[8]POLYTERGENT ® SLF-18 is available from BASF Corporation.

As shown above, the water gain for the examples that use the deinking compositions of the invention is between about 1.8 g and 3.0 g, whereas the examples that use conventional non-ionic surfactants have a water gain in the range from 13.5 to 19.9 g. Clearly, the paper sheet made using the deinking compositions of the invention has significantly less water gain than the paper sheet made using conventional non-ionic deinking surfactants. In other words, significantly less alum size is required to reach the desired size effect when pulp is prepared using the deinking composition of the invention compared to pulp prepared using conventional non-ionic deinking compositions. It is noted that anionic and cationic surfactants produced good water gain values. Nevertheless, these surfactants are known in the art to have poor deinking properties.

Again, as with the effects on brightness and ERIC value, it would be expected that in addition to the C16 to C18 aliphatic alcohol alkoxylates used in the examples, that C19–C25 aliphatic alcohol alkoxylates could also be used to provide significant and unexpected increases in water repellency, especially considering the results from using C18 linear alcohols. Furthermore, it is believed that the benefits of the invention would be realized when up to about 20% of conventional surfactants were used in the deinking composition and it is believed that greater amounts of conventional surfactants (up to about 30% or even up to about 50%) could be used with the surfactants of the invention to produce increased results over the use of conventional surfactants alone. In addition, the benefits of the surfactants on water repellency of the invention were realized even when fatty acids were used in an amount of about 18% by weight of the total surfactants used and it is believed that up to 30% could be used without sacrificing the benefits of the invention.

EXAMPLE 7

Another group of sizing agents includes alkyl ketene dimer (AKD) and alkenyl succinic anhydride (ASA) and they function similarly to one another. In this example, the impact of an exemplary deinking composition of the invention on AKD sizing is evaluated against a conventional deinking composition using a water drop test. For this example, the pulp slurry was connected with the two deinking compositions at the provided surfactant concentrations and 20#/ton of AKD size was applied to the pulp prior to sheet formation. The water drop was determined by applying a pre-determined quantity of destilled water (normally either 5 or 10 μm) onto the surface of the paper sheet and measuring the time in seconds for the water droplet to be completely absorbed by the sheet. A longer water drop time indicates better sizing effect or less water absorbency. The following table demonstrates that pulp deinked with the composition of the present invention provides higher sizing levels (measured by longer water drop times) compared to the levels of the conventional deinking compositions at various levels of surfactant usage rates.

| | Water Drop, seconds | |
|---|---|---|
| Surfactant Concentration, #/t | 85% Linear $C_{18}$ alcohol $(EO)_{20}$/15% fatty acid | 85% Linear $C_{14-15}$ primary alcohol $(EO)_{13}$/15% fatty acid |
| 0 | 310 | 310 |
| 1 | 270 | 160 |
| 2 | 225 | 90 |
| 4 | 180 | 35 |
| 8 | 120 | 8 |
| 12 | 65 | 3 |

As shown in this example, introducing deinking surfactants lowered the sizing effect of the paper sheet, as indicated by the shorter water drop time in seconds. However, using the deinking composition of the invention reduces the water drop time at a much slower rate than conventional deinking compositions. In another words, less sizing agent is required for the final paper product to have certain "size" or water absorbency when paper is produced with pulp deinked with the compositions of the present invention compared to conventional deinking compositions.

EXAMPLE 8

The impact of the deinking surfactants of the invention on AKD sizing was also evaluated in an actual deinking and sheet forming sequence at a given surfactant concentration. In this example, a deinking composition according to the invention and a conventional deinking composition were added to the pulper at 9#/ton of oven-dry fiber. The waste paper was pulped in each case under identical temperatures, pH's, water hardnesses, and other chemical usage rates, etc. and the wash was deinked on the mesh screen in an identical manner. The deinked pulp was diluted to 1% consistency and AKD sizing agent was applied to the pulp at various usage rates. The water drop was measured to determine the effect of the surfactants on the water absorbency or sizing effect of paper formed using the pulp from these examples.

| | Water Drop, seconds | |
|---|---|---|
| AKD size dosage, LB per ton | 85% Linear $C_{18}$ alcohol $(EO)_{20}$/15% fatty acid | 85% Linear $C_{14-15}$ primary alcohol $(EO)_{13}$/15% fatty acid |
| 0 | 0.72 | 0.6 |
| 10 | 5 | 4 |
| 20 | 62 | 33 |
| 30 | 336 | 151 |
| 45 | 850 | 380 |

As shown above, the deinking composition of the invention provides improved paper size to the deinked pulp, particularly at the rates typically used by mills, i.e., an AKD usage rate of 20 and above. This provides additional evidence to the evidence from Example 7 that the deinking compositions of the invention offer a significant reduction in the AKD size usage rate as well as improved deinking performance. Moreover, the reduction of size usage on the paper machine also reduces the deposition potential associated with AKD and its derivatives and allows mills to have improved machine runability.

EXAMPLE 9

The impact of the deinking composition on machine deposition was evaluated using a specialized laboratory test. In this test, the deinked pulps prepared in Example 8 were separately added to a KitchenAid® mixer under controlled conditions to simulate the shear force experienced on the paper machine wires and felts. Equal amounts of the sizing agent, in this case 20 pounds per ton of AKD was added. The pulps were each mixed at typical machine temperatures and pH's (125° F. and pH 6) for an hour and the blades of the mixer were visually examined for deposition potential. The pulp deinked with the conventional deinking composition and the pulp deinked with the deinking composition of the invention were tested and the results indicated that the pulp deinked with the surfactants of the invention had considerably less deposition potential.

EXAMPLE 10

The deinking composition of the invention has a significantly reduced foaming potential compared to conventional deinking surfactants. High foam potential is generally associated with low efficiency at wash stages, water clarification stages, etc. A deinking surfactant of the present invention was tested against a conventional deinking surfactant under the conditions currently used in several wash deinking mills. Foam potential tests were conducted by introducing air at a given rate into pulp slurry and measuring the weight of the foam removed from the vessel. The pulp slurry was tested at 1% consistency, defined as the weight percentage of fibrous material in the pulp slurry. The results are presented below.

| | Foam Potentional (weight in grams) | |
|---|---|---|
| Drinking Mill Processing Conditions | 85% Linear $C_{18}$ alcohol $(EO)_{20}/15\%$ fatty acid | 85% Linear $C_{14-15}$ primary alcohol $(EO)_{13}/15\%$ fatty acid |
| A Mill Conditions | 550 | 799 |
| B Mill Conditions | 355 | 520 |
| C Mill Conditions | 321 | 500 |
| D Mill Conditions | 293 | 370 |

In all cases, the deinking composition of the invention produced reduced foaming potential.

EXAMPLE 11

The deinking compositions of the invention were also tested in flotation processes and improved ink removal was also observed in these processes. In this example, the wastepaper was pulped in the usual manner with deinking surfactant or composition added in the pulper. The pulp was then diluted to 1% consistency and subjected to air flotation for 90 seconds in a laboratory float device (float cell). Foam that contained ink was removed or rejected from the cell. Pads were made from the pulp left in the vessel after flotation (the "accept") and brightness and ERIC values were determined as shown below.

| | Flotation Ink Removal | |
|---|---|---|
| | 85% Linear $C_{18}$ alcohol $(EO)_{20}/15\%$ fatty acid | 85% Linear $C_{14-15}$ primary alcohol $(EO)_{13}/15\%$ fatty acid |
| Floated Pulp Brightness, % | 46.3 | 43.9 |
| Floated Pulp ERIC, PPM | 1109 | 1471 |

The improved brightness and the lower ERIC value of the pulp treated with the deinking compositions of the invention indicates that ink was more easily removed when the deinking composition of the invention was used as opposed to the conventional deinking compositions.

EXAMPLE 12

A mill trial of a deinking composition of the invention was conducted. The mill processed 100% old newsprint with three stages of wash deinking and used 100% of the deinked pulp to manufacture various grades of newsprint. This allowed the benefits of the deinking compositions of the invention to be monitored in both deinking plant and the paper machine. The data measured include deinking surfactant usage rate, washed pulp brightness, ERIC, water absorbency measured using a water drop test, and defoamer usage on the paper machine. The results are summarized in the table below.

| | Pre trial data (85% Linear $C_{14-15}$ primary alcohol $(EO)_{13}/15\%$ fatty acid) | Trial data (85% Linear $C_{18}$ alcohol $(EO)_{20}/15\%$ fatty acid) |
|---|---|---|
| Surfactant Usage Rate, LB/Ton | 8.5–9.0 | 7.5 |
| Average Washed Pulp Brightness, % | 44–46 | 46–49 |
| Average Washed Pulp ERIC, PPM | 450–600 | 350–460 |
| Water Drop of Paper Sheet, seconds | 50–70 | 80–130 |
| Defoamer Usage Rate, ml/minutes | 80 | 10 |
| Clarified Water Turbidity, NTU | 20–40 | 20–30 |

Based on the laboratory data suggesting the significant improvement of deinking efficiency using the deinking compositions of the invention, the mill elected to conduct the trial at a lower usage rate of 7.5 #/ton instead of the normal 8.5–9.0 #/ton used for conventional deinking compositions. The washed pulp brightness improved by 1–3 points on average and the ERIC value decreased by about 100–150 PPM using the deinking composition of the invention. Thus, even at a reduced usage, the deinking composition of the invention was able to deliver improved wash deinking efficiency, thereby allowing the mill to lower the bleach chemical usage rate for several grades of paper. The deinking composition of the invention was also compatible with the water clarification chemistry. The dissolved air flotation (DAF) units operated well and turbidity was maintained at or slightly below the pre-trial levels. The defoamer usage rate was also reduced from 80 ml/min to about 10 ml/min. One important observation was the increase in water drop on the final paper sheets. The mill went from the pre-trial water drop average of 50–70 to 80–130 during the period while the same AKD size usage rate was maintained on the paper machine. The initial mill trial demonstrates the improved wash deinking efficiency, reduced foaming potential, and size benefit associated with the deinking compositions of the invention.

As shown above, the nature of the surfactants in the deinking compositions of the invention is very important. In particular, the surfactants used in the deinking compositions of the invention have a positive impact on deinking efficiency by positively affecting the ability of the surfactants to effectively release the printed ink from the cellulosic fiber, by effectively stabilizing the released inks in the aqueous phase to prevent them from depositing back onto the fiber, and by allowing the stabilized ink to be separated from the fiber during the washing operation. Therefore, the surfactants used in the deinking compositions of the invention have a positive effect on the resulting paper as demonstrated by the unexpected increase in paper brightness and decrease in ERIC values over conventional deinking compositions that use conventional deinking surfactants. Furthermore, for industries such as the recycled newsprint industry that use sizing agents to produce paper having a desired level of water repellency, the surfactants used in the deinking compositions of the invention have a significant positive effect on the paper machine runability because less sizing agent is needed to produce paper having the desired water repellency. The deinking compositions of the invention are also able to deink aged wastepaper better than conventional deinking compositions. In addition, the deinking compositions of the invention can produce better ink separation at different pH's, water hardness levels, temperatures, and washing consistencies than conventional deinking compositions. The deinking compositions of the invention accomplish these benefits while still producing the low levels of foaming desired in the art for wastewater deinking processes.

It is understood that upon reading the above description of the present invention, one skilled in the art could make changes and variations therefrom. These changes and variations are included in the spirit and scope of the following appended claims.

What is claimed is:

1. A non-flotation process for deinking recycled newsprint comprising adding a deinking composition that is solid at room temperature to a recycled newsprint pulp stream in a washing stage and separating ink released by the recycled newsprint, the composition comprising active ingredients consisting of alkoxylates of the following structure:

$$R-O-(CH_2-CH_2-O)_nH,$$

wherein R is a straight chain or branched chain alkyl group of from about 16 to about 18 carbons and n is from about 18 to about 25.

2. The process according to claim 1, wherein the alkoxylates are saturated.

3. The process according to claim 1, wherein R is a straight chained, C16–C18 alkyl group.

4. The process according to claim 1, wherein the alkoxylates are based on primary or secondary alcohols.

5. The process according to claim 1, wherein the recycled newsprint pulp stream further comprising from 0 to about 25% by weight of one or more fatty acids based on the total weight of surfactants.

6. The process according to claim 5, wherein said one or more fatty acids are selected from the group consisting of lauric acid, oleic acid, stearic acid, tall oil fatty acid, tallow fatty acid coconut fatty acid, and mixtures thereof.

7. The process according to claim 1, wherein the alkoxylates are present in an amount from about 0.3% to about 0.7% by weight based on the oven-dry weight of the newsprint.

8. The process according to claim 1, wherein the recycled newsprint pulp stream is at a pH of from about 7 about 10.

9. In a non-flotation process for making recycled paper from recycled newsprint pulp that uses less sizing agents to produce paper with the same level of water repellency, the improvement comprising: adding a deinking composition that is solid at room temperature to a recycled newsprint pulp stream in a washing stage and separating ink released by the recycled newsprint, the composition comprising active ingredients consisting of non-ionic, aliphatic, monohydric alcohol surfactant alkoxylates of the following structure:

$$R-O-(CH_2-CH_2-O)_nH,$$

wherein R is a straight chain or branched chain alkyl of from about 16 to about 18 carbons and n is from about 18 to about 25, wherein the process produces paper using less sizing agents.

10. A non-flotation process for deinking wastepaper comprising adding a deinking composition that is solid at room temperature to a recycled newsprint pulp stream in a washing stage and separating ink by released by the recycled newsprint, the composition comprising active ingredients consisting of non-ionic, aliphatic, monohydric alcohol surfactant alkoxylates of the following structure:

$$R-O-(CH_2-CH_2-O)_nH,$$

wherein R is a straight chain or branched chain alkyl group of from about 16 to about 18 carbons and n is from about 18 to about 25.

11. A non-flotation process for deinking recycled newsprint comprising adding a deinking composition that is solid at room temperature to a recycled newsprint pulp stream in a washing stage and separating ink released by the recycled newsprint, the composition comprising active ingredients consisting of non-ionic, aliphatic, monohydric alcohol surfactant alkoxylates of the following structure:

$$R-O-(CH_2-CH_2-O)_nH,$$

wherein R is a straight chain or branched chain C18 alkyl group, and n is 21.

12. The process of claim 11, wherein R is a straight chain.

* * * * *